Patented Dec. 23, 1952

2,622,992

UNITED STATES PATENT OFFICE 2,622,992

METHOD OF INSULATING METAL SURFACES

Einar Bergve, Froen, Vestre Aker, Norway

No Drawing. Application December 2, 1949, Serial No. 130,873. In Norway December 4, 1948

7 Claims. (Cl. 117—46)

The present invention relates to an insulating material essentially comprising sulphite cellulose waste liquor or products derived from such liquor and having electric and mechanical properties making the same adapted both for electric and chemical insulation purposes and for the purpose of impregnation of surface layers of any article or windings or the like coverings of such articles. Examples of the use of the new material are: insulation of iron sheets for use in transformers or rotary electric machinery, impregnation of covering windings on electric coils, and corrosion protection for instance as a grounding for further coatings on constructions or constructional elements of iron, steel or metals or other solids subjected to corrosion.

According to the invention, the insulating material of the type defined is subjected to a heat treatment more extensive than that required for the drying of the material, as I have found that such material or derivatives of the same has physical, chemical or dielectric properties making this extremely cheap raw material, which presents itself in abundant quantities as a waste material in the sulphite process of cellulose production, exceedingly adapted for the above or other important purposes. Hereby the waste liquor produced in the earth alkali, magnesium or ammonium processes or mixtures of the same have been found to be especially adapted. At present calcium and ammonium sulphite are most commonly used in the sulphite cellulose mills, and the waste liquor recovered from the evaporation apparatus used in this production is in many cases adapted for direct use for the present purposes without any purification at all. It is however also possible to subject the waste liquor to a chemical treatment or raffination and to use the material thus converted or purified as an initial material in the production of the insulating material according to the invention.

In order to facilitate the insulation obtained by means of the material according to the invention, a small quantity of a water soluble coloring material, especially red or black conveniently may be added to the material, to the effect that any differences in the properties of the layers produced are clearly presented.

In view of the fact that sulphite cellulose waste liquor in a comparatively dry state is adhesive, it may in many cases be found convenient to add a filler in the form of finely ground minerals, whereby the adhesion is reduced. The filler mentioned must be of high electric resistance in order that the insulating property of the material not be reduced, and should also be of a low specific weight in order not to settle as a deposit in the liquor during application or storing of the material.

Various methods for the production of coatings of an insulating material according to the invention are described hereafter in connection with a statement of the physical and chemical conditions making the material adapted for the purposes desired.

Ordinary waste liquor recovered from an evaporation apparatus of a sulphite cellulose mill usually contains about 50 percent solid substances and is tenacious and viscous and is readily applied to a surface, such as that of an iron sheet, in a layer of desired thickness, and as the material readily wets iron, the application may be performed by means of rollers. The thickness of the coating may be adjusted without difficulty as desired, so as to be below the limits specified for transformer sheets. Depending upon the viscosity it may consequently be found convenient to increase the dry content, for instance to about 60 to 70 percent or more whereby the desired thickness is more easily obtained by adjustment of the roller pressure. Contingently, two applications may be performed successively accompanied by a more or less extensive drying between the two pairs of application rollers.

Upon completed application, that is upon the second step of application, if the application is performed in two steps, a drying or baking is effected in any suitable manner, for instance by means of electric heating elements, high frequency treatment or application of infra red rays. This coating has the very great advantage not to effect any substantial blunting of the edges of cutting tools, contrary to for instance kaolin, water-glass and other substances commonly used in insulating materials. A further advantage resides in the fact that no combustible or explosive gases are developed during the heat treatment, whereby the apparatus required for the performance of the treatment is highly simplified compared with those used in connection with ordinary lacquers.

When this heat treatment is effected at temperatures within the range from about 120° C. to about 240° C., a coating is obtained which is practically anhydrous and looks like an ordinary resin or plastic lacquer. This coating is however not water resistant. It is also adhesive, a defect which however, as mentioned, may be overcome to some extent by the addition of a mineral filler. Nevertheless, the coating remains sensitive to such degree that for instance moist fingers will leave permanent markings effecting a local decrease in insulation capacity. In order to overcome this disadvantage the insulating coating may be covered by a layer of more resistant substance, such as a thin covering of water-glass which will react with the surface of the insulating coating proper and form a hard resistant film, essentially consisting of earth alkali silicate. It is also possible to use a covering film of ordinary resin or plastic lacquers.

The application of this covering coating may also be effected by means of rollers, which preferably are arranged immediately successive to the application rollers for the insulating material proper, if desired with an intermediate zone of more or less extensive heating for the purpose of partial drying of the surface of the insulating material. When water-glass is used in the covering coating, care should be taken that the article to be insulated is not too warm as otherwise a smooth surface is unobtainable due to the reaction between the substances in the two layers, a reaction which in the heat takes place practically instantaneously.

When the heat treatment is performed at a temperature in the range from about 240° C. to about 270° C., a temperature range which however may vary in dependence upon the substances to be treated and the over-all conditions, a coating of increasing hydrophobic properties is directly obtained, a coating which after some time becomes sufficiently water resistant for a great number of purposes. The surface grows dark and may be shiny and hard, similar to the surface of a coating of an ordinary resin lacquer upon baking and the insulating power of the coating is very high. At a temperature within the above range a substantial portion of the carbohydrates contained in the material, amounting to 15–20 per cent of the dry content is converted to practically water resistant products simultaneously with the formation of solid ligno-sulphonic compounds.

This latter process requires a comparatively long period of time, but when the temperature of the heat treatment is further increased towards, but always below the decomposition temperature of the ligno-sulphonic compounds present in the material a water resistance is obtainable which is found sufficient for most practical purposes. The insulation thereby obtained does, even without any such covering as mentioned above, satisfy the highest requirements stipulated with regard to transformer and even rotary machinery iron sheets and may consequently be described as an insulator of highest class. A property of special importance of the insulating material resides in the fact that the same may so completely wet the surface to which it is applied that for instance iron sheets receive a complete covering of all graphite points, which has previously only been obtained with utmost difficulties and, as a rule, only by the use of comparatively thick coatings of the insulating material. This incomplete covering of the graphite points has been contributory to the decreasing insulating power of ordinary insulating materials by increasing pressure, a defect not pertaining to the present insulating material.

The temperature used in this heat treatment is highly dependent upon the sulphite waste liquor used and the conditions prevailing at the production of the same. It is however to be presumed that the decomposition temperature of the ligno-sulphonic compounds in question does not essentially surpass about 375° C.

The water resistance of the insulating material may also be increased by the addition of various suitable substances, whereby various other properties are also obtainable. Thus, one or more aldehydes may be added to the sulphite waste liquor whereby a substantial chemical combining is obtained at ordinary temperature together with an increased water resistance. Further one or more organic acids, especially polybasic acids or oxy acids may be added, which all seem to react with the decomposition products of the carbohydrates during the heat treatment.

A similar result may also be obtained when the sulphite waste liquor prior to the heat treatment is subjected to a treatment for the purpose of removing the base to the effect that free ligno-sulphonic acid is recovered, which by the heat treatment forms water resistant coatings of good and stable insulation properties already at a very moderate heat treatment.

It should however be noted that a coating made of a waste liquor from which the base is removed, does not adhere perfectly to the surface to be insulated. It is consequently preferable not to perform a complete removal of the base or, contingently, to make an addition of a suitable acid, such as phosphorous acid, in order to ameliorate the adhering quality. The addition of phosphorous acid also is of a similar advantageous effect to that obtained by addition of organic acids, mentioned above. When heating such materials, a substantial portion of the sulphur content of the free ligno-sulphonic acid is separated out, a fact which is of great importance with regard to the regeneration of waste iron sheets by smelting. The free ligno-sulphonic acid also reacts with aldehydes, giving a coating resistant to boiling water.

The removal of the base may be effected by addition of hydro-fluoric acid, the compositions $CaF_2$ and $MgF_2$ formed by such addition being absolutely insoluble in weak acids. In view of their high electric resistance such fluorides do not need to be removed from the material.

When the temperature of the heat treatment is of such value as to incite a selective thermal decomposition of the carbohydrate complexes, the latter will smelt out or separate in the surface of the coating as a loose layer which may readily be removed by brushing or the like. The coating left consists of the ligno-sulphonic compounds of very high insulation power, great hardness and water resistance and high adhesion to the supporting surface. The temperature of this treatment also obviously must be below the decomposition temperature of the ligno-sulphonic compounds.

What I claim is:

1. A method for the preparation of an electrically insulating coating on a metal surface, especially adapted for iron sheets to be utilized in magnetic cores of electrical machinery, comprising the steps of applying an ammonium sulfite cellulose waste liquor on the metal surface to be insulated and then subjecting the same to a heat treatment at a temperature between about 240° and 375° C.

2. A method for the preparation of an electrically insulating coating on a metal surface, especially adapted for iron sheets to be utilized in magnetic cores of electrical machinery, comprising the steps of applying an ammonium sulfite cellulose waste liquor on the metal surface to be insulated and then subjecting the same to a heat treatment at a temperature between about 240° and 375° C., whereupon the coating so formed is covered with a film of water glass.

3. A method for the preparation of an electrically insulating coating on a metal surface, especially adapted for iron sheets to be utilized in magnetic cores of electrical machinery, comprising the steps of applying an ammonium sulfite cellulose waste liquor on the metal surface to be insulated and then subjecting the same to a heat treatment at a temperature between about 240° and 375° C. whereupon the coating so formed is covered with a film of water insoluble lacquer.

4. A method as claimed in claim 1, comprising an addition of an aldehyde to the sulfite cellulose waste liquor prior to the heat treatment of the same.

5. A method as claimed in claim 1, comprising the addition of an aldehyde and of phosphorous acid to the sulfite cellulose waste liquor prior to the heat treatment.

6. A method as claimed in claim 1, comprising the addition of hydrofluoric acid to the sulfite cellulose waste liquor prior to the heat treatment of the same.

7. A method as claimed in claim 1, comprising the steps of brushing the heat treated coated metal surface to remove the removable decomposition products formed from the carbohydrates obtained by the heat treatment.

EINAR BERGVE.

REFERENCES CITED

The following references are of record in the file of this patent:

UNITED STATES PATENTS

| Number | Name | Date |
| --- | --- | --- |
| 1,185,604 | Puring | May 30, 1916 |
| 1,381,118 | Gerlach | June 14, 1921 |
| 1,501,975 | Strehlenert | July 22, 1924 |
| 1,699,294 | Hoskins | Jan. 15, 1929 |
| 1,860,043 | Ludwigsen | May 24, 1932 |
| 1,977,728 | Leach | Oct. 24, 1934 |
| 2,457,357 | Frenn | Dec. 28, 1948 |